United States Patent
Saito et al.

(10) Patent No.: US 10,297,808 B2
(45) Date of Patent: May 21, 2019

(54) BATTERY WIRING MODULE AND POWER SUPPLY DEVICE PROVIDED WITH BATTERY WIRING MODULE

(71) Applicants: Sumitomo Electric Industries, Ltd., Osaka (JP); Sumitomo Electric Printed Circuits, Inc., Koka (JP); AutoNetworks Technologies, Ltd., Yokkaichi (JP); Sumitomo Wiring Systems, Ltd., Yokkaichi (JP)

(72) Inventors: Hirohisa Saito, Osaka (JP); Yoshifumi Uchita, Koka (JP); Shinichi Takase, Yokkaichi (JP)

(73) Assignees: Sumitomo Electric Industries, Ltd., Osaka-shi (JP); Sumitomo Electric Printed Circuits, Inc., Koka-shi (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 15/565,843

(22) PCT Filed: Apr. 25, 2016

(86) PCT No.: PCT/JP2016/062935
§ 371 (c)(1),
(2) Date: Oct. 11, 2017

(87) PCT Pub. No.: WO2016/175180
PCT Pub. Date: Nov. 3, 2016

(65) Prior Publication Data
US 2018/0130989 A1    May 10, 2018

(30) Foreign Application Priority Data
Apr. 27, 2015 (JP) .................... 2015-090728

(51) Int. Cl.
*H01M 2/20* (2006.01)
*H01M 10/48* (2006.01)
*H01M 10/42* (2006.01)

(52) U.S. Cl.
CPC ......... *H01M 2/206* (2013.01); *H01M 10/482* (2013.01); *H01M 10/425* (2013.01); *H01M 10/486* (2013.01); *H01M 2220/20* (2013.01)

(58) Field of Classification Search
CPC .......... H01M 2/206; H01M 2/10; H01M 2/20; H01M 2220/20
(Continued)

(56) References Cited

U.S. PATENT DOCUMENTS

2012/0019061 A1* 1/2012 Nishihara ........... H01M 2/1077
307/10.1

FOREIGN PATENT DOCUMENTS

| JP | 2011-049047 A | 3/2011 |
| JP | 2013-033634 A | 2/2013 |
| WO | 2010/113455 A1 | 10/2010 |

OTHER PUBLICATIONS

International Preliminary Report on Patentability in counterpart International Application No. PCT/JP2016/062935, dated Oct. 31, 2017.

* cited by examiner

*Primary Examiner* — Gary D Harris
(74) *Attorney, Agent, or Firm* — Baker Botts L.L.P.; Michael A. Sartori (57) ABSTRACT

A battery wiring module includes bus bars and a flexible wiring board having wires connected to the respective bus bars. The flexible wiring board has a body portion and extensions extending from the body portion toward the respective bus bars. Each of the extensions supports one of the wires and has an end section where a pad is arranged, (Continued)

that is part of each of the wires. Each of the bus bars has at least one cutout portion, and the pad is arranged on each of the bus bars such that the pad overlaps at least part of at least one cutout portion. The pad and the at least part of the at least one cutout portion are connected to each other with solder.

12 Claims, 8 Drawing Sheets

(58) Field of Classification Search
USPC .......................................................... 429/121
See application file for complete search history.

Fig.16

BATTERY WIRING MODULE AND POWER SUPPLY DEVICE PROVIDED WITH BATTERY WIRING MODULE

TECHNICAL FIELD

The present invention relates to a battery wiring module and a power supply device including the battery wiring module.

The present application claims priority from Japanese Patent Application No. 2015-090728 filed on Apr. 27, 2015, the entire contents of which are incorporated by reference herein.

BACKGROUND ART

Patent Documents Nos. 1 and 2 each disclose a power supply device that includes a plurality of battery cells and a battery wiring module, which connects the battery cells in series. The battery wiring module includes a plurality of bus bars, each of which connects a positive terminal of a corresponding one of the battery cells and a negative terminal of an adjacent one of the battery cells to each other, and a plurality of wires connected to the corresponding bus bars.

Patent Document 3 discloses a power supply device including a plurality of battery cells and a battery wiring module, which connects the battery cells in series. The battery wiring module includes a plurality of bus bars, each of which connects a positive terminal of a corresponding one of the battery cells and a negative terminal of an adjacent one of the battery cells to each other, and a flexible wiring board including wires connected to the bus bars.

PRIOR ART DOCUMENTS

Patent Documents

Patent Document 1: Japanese Laid-Open Patent Publication No. 2011-49047
Patent Document 2: Japanese Laid-Open Patent Publication No. 2013-33634
Patent Document 3: International Publication No. 2010/113455

SUMMARY OF THE INVENTION

In accordance with a first aspect of the present invention, a battery wiring module is provided that includes a plurality of bus bars for connecting a plurality of battery cells of a battery block in series and a flexible wiring board having a plurality of wires each connected to a corresponding one of the bus bars. The flexible wiring board has a body portion and a plurality of extensions that extends from the body portion toward the respective bus bars. Each of the extensions supports one of the wires. Each extension has an end section. A pad that is part of each wire is arranged on the end section. Each of the bus bars has at least one cutout portion. The pad is arranged on one of the bus bars such that the pad overlaps at least part of the at least one cutout portion. The pad and the at least part of the at least one cutout portion are connected to each other with solder.

In accordance with a second aspect of the present invention, a battery wiring module is provided that includes a plurality of bus bars for connecting a plurality of battery cells of a battery block in series and a flexible wiring board having a plurality of wires each connected to a corresponding one of the bus bars. The flexible wiring board has a body portion and a plurality of extensions that extends from the body portion toward the respective bus bars. Each of the extensions supports one of the wires. Each extension has an end section. A pad that is part of each wire is arranged on the end section. Each of the bus bars has a plurality of projecting portions. The pad is arranged on one of the bus bars such that the pad overlaps at least part of the projecting portions. The pad and the at least part of the projecting portions are connected to each other with solder.

In accordance with a third aspect of the present invention, a battery wiring module is provided that includes a plurality of bus bars for connecting a plurality of battery cells of a battery block in series and a flexible wiring board having a plurality of wires each connected to a corresponding one of the bus bars. The flexible wiring board has a body portion and a plurality of extensions that extends from the body portion toward the respective bus bars. The bus bars are arranged at a different level with respect to the body portion of the flexible wiring board. Each of the extensions supports one of the wires. Each extension has an end section. A pad that is part of each wire is arranged on the end section. Each of the bus bars has a plurality of cutout portions or a plurality of projecting portions. The pad is arranged on a surface of one of the bus bars that faces the body portion of the flexible wiring board such that the pad overlaps the entire cutout portions or the entire projecting portions and that part of the pad is exposed from a peripheral edge of the bus bar. Each pad and the corresponding bas bar are connected to each other with solder that is arranged at least in the cutout portions or on outer peripheries of the projecting portions and on the part of the pad exposed from the peripheral edge of the bus bar.

MODES FOR CARRYING OUT THE INVENTION

Problems that the Present Disclosure is to Solve

The power supply device of Patent Document 3 may cause a crack in a solder-connected portion. For example, when the power supply device is vibrated, moved, or subjected to temperature variation, and thus expands and contracts, the battery cells are separated from or brought closer to one another. This separates the bus bars from one another or brings the bus bars closer to one another, thus changing the positions of the bus bars relative to one another. As a result, a section of the flexible wiring board between two bus bar connecting sections is strained or warped to apply stress to a solder-connected portion (a connecting portion between either of the bus bar connecting sections and the flexible wiring board) intermittently. If such stress is applied to the solder-connected portion frequently, a crack may occur in the solder-connected portion.

It is an objective of the present invention to provide a battery wiring module that restrains stress from being applied to a solder-connected portion and is less likely to break even when receiving stress, and a power supply device including the battery wiring module.

Effects of the Invention

The present disclosure provides a battery wiring module that restrains stress from being applied to a solder-connected portion and is less likely to break even when receiving stress, and a power supply device including the battery wiring module.

Description of the Embodiments of the Present Invention

The embodiments of the present invention will now be described as listed below.

(1) A battery wiring module according to an embodiment of the present invention includes a plurality of bus bars for connecting a plurality of battery cells of a battery block in series and a flexible wiring board having a plurality of wires each connected to a corresponding one of the bus bars. The flexible wiring board has a body portion and a plurality of extensions that extends from the body portion toward the respective bus bars. Each of the extensions supports a corresponding one of the wires. Each extension has an end section. A pad, which is part of each wire, is arranged on the end section. Each of the bus bars has at least one cutout portion. Each of the pads is arranged on a corresponding one of the bus bars such that the pad overlaps at least part of the at least one cutout portion. The pad and the at least part of the at least one cutout portion are connected to each other with solder.

In this configuration, each extension, which extends from the body portion of the flexible wiring board toward the corresponding bus bar, is connected to the bus bar. Stress is thus less likely to be applied to a solder-connected portion even when the battery cells are vibrated, moved, or subjected to temperature variation, and thus expand and contract. Also, the solder that connects the pad of each wire to the corresponding bus bar forms a fillet along the cutout portion, which is arranged in the bus bar. The length of the fillet, which is formed along a side surface of the bus bar, is increased compared to a solder-connected structure in which a bus bar without a cutout portion and a pad of a wire are connected to each other with solder. This improves the connection strength of the solder-connected portion between the bus bar and the pad of the wire and hampers breakage caused by a crack during long-term use. That is, the above-described solder-connected structure is less likely to break even when receiving stress.

(2) In the above-described battery wiring module, the bus bars are arranged at a different level with respect to the body portion of the flexible wiring board. Each pad is connected to a surface of the corresponding bus bar that faces the body portion of the flexible wiring board.

If each pad is connected to the surface opposite to the surface of the corresponding bus bar that faces the body portion of the flexible wiring board, the corresponding extension of the flexible wiring board and the peripheral edge of the bus bar may contact each other. In this case, when the battery cells vibrate, the peripheral edge of the bus bar rubs on the extension of the flexible wiring board, which may cut the extension. However, in the above-described configuration, the extension of the flexible wiring board and the peripheral edge of the bus bar cannot contact each other. This restrains wear and deterioration, such as cutting of the extension caused by rubbing.

(3) In the above-described battery wiring module, each of the pads is positioned with respect to a corresponding one of the bus bars such that part of the pad is exposed from peripheral edges of the bus bars.

This configuration facilitates formation of the fillet on the side surface of the bus bar. As a result, the connection strength of each solder-connected portion between the bus bar and the pad of the wire is further improved.

(4) In the above-described battery wiring module, each of the bus bars has a plurality of cutout portions.

In this configuration, a projection is formed between two cutout portions. The projection brings about the effect described below. When the battery cells are vibrated, moved, or subjected to temperature variation, and thus expand and contract, the bus bar may be twisted or bent. At this time, stress concentrates on the cutout portions and the stress applied to the projection is restrained. That is, in the solder-connected portion between each bar and the corresponding pad of the above-described configuration, the stress caused by change of the relative position of the bus bar is less likely to be applied to at least the projection. This restrains peeling of the bus bar and the pad from each other, which is caused by change of the relative position of the bus bar.

(5) In the above-described battery wiring module, each of the bus bars has a projection arranged between two cutout portions. The projection has a basal section and a distal end section. The width of the distal end section is greater than the width of the basal section. This configuration further increases the length of the fillet, which is formed along the side surface of the bus bar, thus further improving the connection strength of the solder-connected portion.

(6) In the above-described battery wiring module, the at least one cutout portion includes a first section on a side corresponding to the peripheral edge of the corresponding bus bar and a second section located closer to the center of the bus bar than the first section. The second section has a greater width than the first section. This configuration further increases the length of the fillet, which is formed along the side surface of the bus bar, thus further improving the connection strength of the solder-connected portion.

(7) A battery wiring module according to another embodiment of the present invention includes a plurality of bus bars for connecting a plurality of battery cells of a battery block in series and a flexible wiring board having a plurality of wires each connected to a corresponding one of the bus bars. The flexible wiring board has a body portion and a plurality of extensions that extends from the body portion toward the corresponding bus bars. Each of the extensions supports a corresponding one of the wires. Each extension has an end section. A pad, which is part of each wire, is arranged on the end section. Each of the bus bars has a plurality of projecting portions. Each of the pads is arranged on a corresponding one of the bus bars such that the pad overlaps at least part of the projecting portions. The pad and the at least part of the projecting portions are connected to each other with solder.

In this configuration, each extension, which extends from the body portion of the flexible wiring board toward the corresponding bus bar, is connected to the bus bar. As a result, even when the battery cells are vibrated, moved, or subjected to temperature variation, and thus expand and contract, stress is less likely to be applied to the solder-connected portion. In addition, the solder that connects the pad of each wire and the corresponding bus bar forms a fillet along each projecting portion, which is arranged in the bus bar. The length of the fillet, which is formed along the side surface of the bus bar, is thus increased compared to a solder-connected structure in which a bus bar without a projecting portion and a pad of a wire are connected to each other with solder. This improves the connection strength of the solder-connected portion between the bus bar and the pad of the wire and restrains breakage caused by a crack during long-term use. That is, the above-described solder-connected structure is less likely to break even when receiving stress.

(8) In the above-described battery wiring module, the projecting portions each have a basal section and a distal end section. The width of the distal end section is greater than the width of the basal section. This configuration further increases the length of the fillet, which is formed along the side surface of the bus bar, thus further improving the connection strength of the solder-connected portion.

(9) A battery wiring module according to another embodiment of the present invention includes a plurality of bus bars for connecting a plurality of battery cells of a battery block in series and a flexible wiring board having a plurality of wires each connected to a corresponding one of the bus bars. The flexible wiring board has a body portion and a plurality of extensions that extends from the body portion toward the respective bus bars. The bus bars are arranged at a different level with respect to the body portion of the flexible wiring board. Each of the extensions supports one of the wires. Each extension has an end section. A pad, which is part of each wire, is arranged on the end section. Each of the bus bars has a plurality of cutout portions or a plurality of projecting portions. The pads are each arranged on a surface of a corresponding one of the bus bars that faces the body portion of the flexible wiring board such that the pad overlaps the entire cutout portions or the entire projecting portions and that part of the pad is exposed from a peripheral edge of the bus bar. Each pad and the corresponding bus bar are connected to each other with solder that is arranged at least in the cutout portions or on outer peripheries of the projecting portions and on the part of the pad exposed from the peripheral edge of the bus bar.

In this configuration, at least the advantages described for the embodiments (1) to (4) and (7) are obtained.

(10) A power supply device includes any one of the above-described battery wiring modules and a plurality of battery cells connected together by the battery wiring module. This configuration restrains stress from being applied to the solder-connected portion and the solder-connected portion is less likely to break even when receiving stress. Further, since the wires connected to the bus bars are arranged on the flexible wiring board, it is unnecessary to connect the wires separately to the corresponding bus bars. This simplifies assembling the power supply device.

Details of First Embodiment

A battery wiring module and a power supply device including the battery wiring module according to a first embodiment of the present invention will now be described with reference to the attached drawings. The invention is not restricted to the illustration herein but is represented by the attached claims. It is considered that the invention includes equivalents of the claims, as well as any modification within the scope of the claims.

A power supply device 1 will hereafter be described with reference to FIGS. 1 and 2.

The power supply device 1 includes a plurality of battery cells 10 and a battery wiring module 20, which connects the battery cells 10 together. Each of the battery cells 10 is configured by a rechargeable battery. A lithium-ion rechargeable battery, a lithium-ion-polymer rechargeable battery, a nickel-cadmium battery, a nickel-hydride battery, or a zinc battery, for example, may be used as the rechargeable battery. Each battery cell 10 has a positive terminal 11 and a negative terminal 12. As shown in FIG. 2, the battery cells 10 are arranged such that the positive terminals 11 and the negative terminals 12 are arranged alternately in an arrangement direction DA of the battery cells 10 (see FIG. 2). The battery cells 10 are electrically connected in series through bus bars 21 (as represented by the long dashed double-short dashed lines in FIG. 2). Hereinafter, a set of the battery cells 10 will be referred to as a battery block 2.

Figure 3:
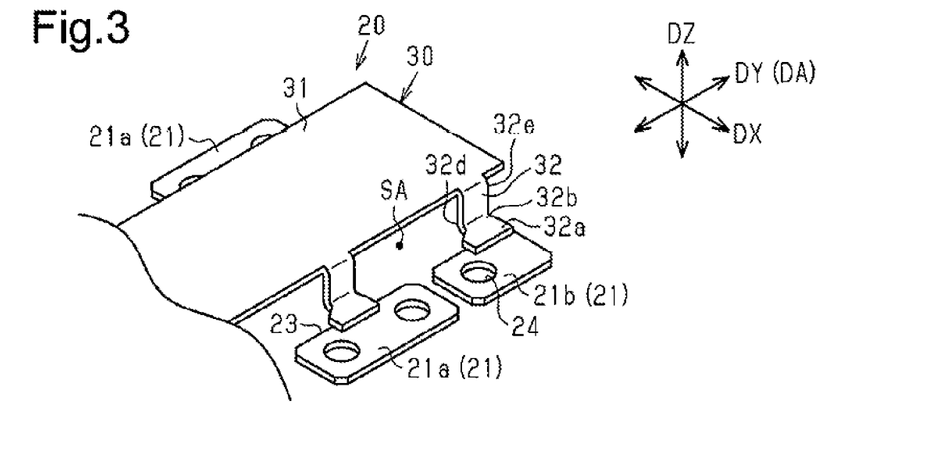
FIG. 3 is a perspective view showing part of a battery wiring module.

With reference to FIG. 3, the battery wiring module 20 includes the aforementioned bus bars 21 and a flexible wiring board 30. In the battery wiring module 20, a body portion 31 of the flexible wiring board 30 is arranged at a different level in the vertical direction DZ with respect to the bus bars 21.

Hereinafter, the locations of sections of the battery wiring module 20 will be described with reference to a state in which the battery wiring module 20 is attached to the battery block 2. For example, the downward direction in the battery wiring module 20 represents the direction toward the bottom surface of the battery block 2. The longitudinal direction DY represents the same direction as the arrangement direction DA of the battery cells 10. The transverse direction DX represents the direction perpendicular to the height direction (that is, the vertical direction DZ) and the longitudinal direction DY.

The battery wiring module 20 is mounted on the battery cells 10. The bus bars 21 are each fastened to both the positive terminal 11 and the negative terminal 12 of two adjacent ones of the battery cells 10 or one of the positive terminal 11 and the negative terminal 12 of one of the battery cells 10 (as will be described later). The body portion 31 of the flexible wiring board 30 is arranged higher than the bus bars 21 with respect to an upper surface 2a of the battery block 2. Space SA is arranged between the flexible wiring board 30 and the battery block 2. The space SA is space for accommodating a duct, which receives electrolytic solution ejected from an electrolytic solution discharge valve at the time the pressure in the battery cells increases due to heating of the battery cells.

The bus bars 21 will now be described with reference to FIGS. 4A and 4B.

Each of the bus bars 21 may be formed by pressing a metal plate. A plate of pure copper, tough-pitch copper, or various types of alloys, for example, may be used as the metal plate. Preferably, the bus bars 21 are tin plated.

In the power supply device 1, coupling bus bars 21a and power supply end bus bars 21b are used as the bus bars 21. The power supply end bus bars 21b are attached to those of the battery cells 10 that are arranged at the opposite ends of the battery block 2 (see FIG. 1). Each of the power supply end bus bars 21b has an insertion hole 24, through which the corresponding positive terminal 11 or the corresponding negative terminal 12 is inserted.

Figure 4A:
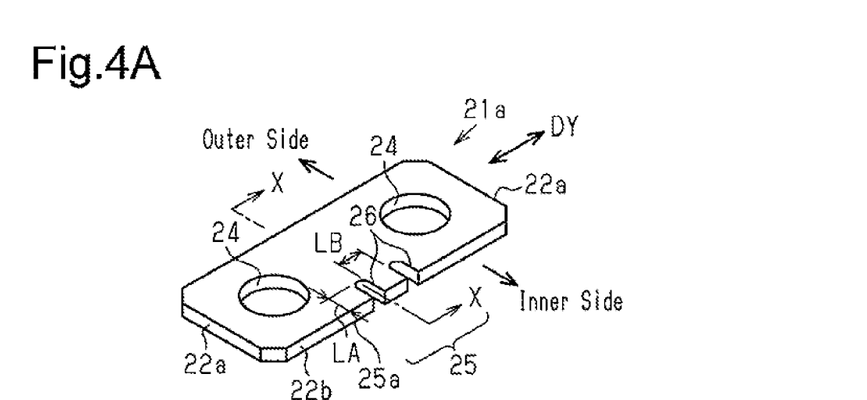
FIG. 4A is a perspective view showing a coupling bus bar.

FIG. 4A is a perspective view showing each of the coupling bus bars 21a.

Figure 1:
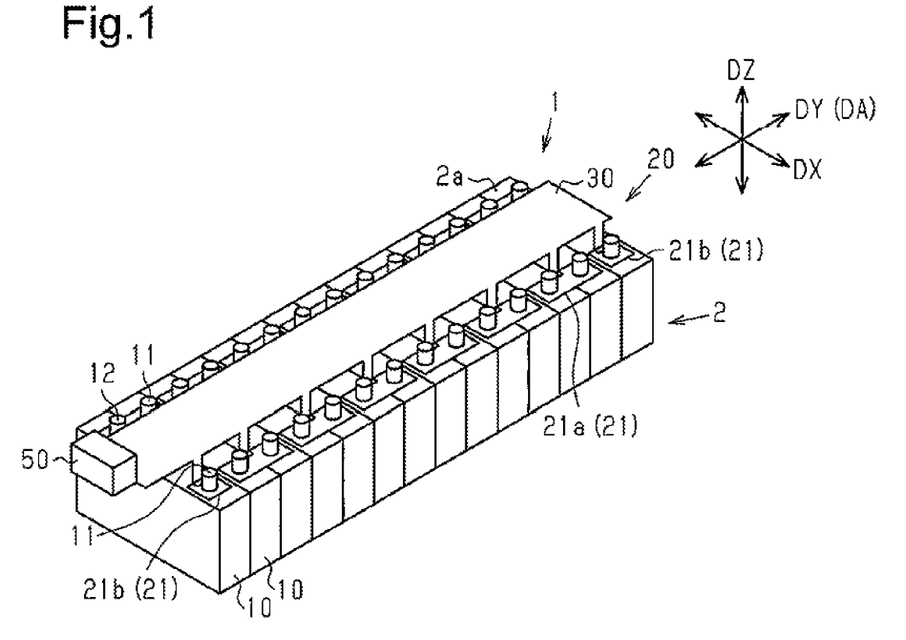
FIG. 1 is a perspective view showing a power supply device.
Figure 2:
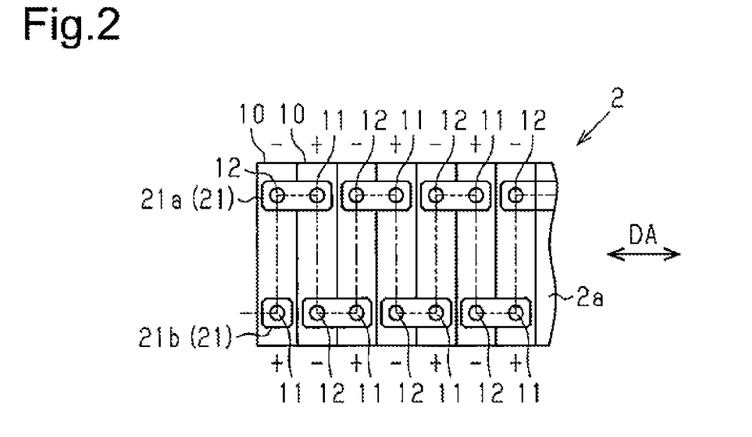
FIG. 2 is a view showing a manner in which battery cells are connected together.

Each coupling bus bar 21a connects two of the battery cells 10 to each other (see FIG. 1). The coupling bus bar 21a has two insertion holes 24, through each of which the corresponding positive terminal 11 or the corresponding negative terminal 12 is inserted.

Each coupling bus bar 21a substantially has a rectangular shape in a plan view. Every corner section of the coupling bus bar 21a is chamfered. Hereinafter, those of the side surfaces of the coupling bus bar 21a perpendicular to the longitudinal direction DY will be referred to as transverse side surfaces 22a. Those of the side surfaces of the coupling bus bar 21a extending in the longitudinal direction DY will be referred to as longitudinal side surfaces 22b. Further, as viewed in the state of the coupling bus bar 21a attached to the corresponding two battery cells 10, the side located closer to the center of each battery cell 10 will be referred to as the inner side of the coupling bus bar 21a. The side opposite to the inner side will be referred to as the outer side of the coupling bus bar 21a.

The two insertion holes 24 are arranged in the longitudinal direction DY. One of the insertion holes 24 is located closer to one of the transverse side surfaces 22a of the coupling bus bar 21a. The other one of the insertion holes 24 is located closer to the other one of the transverse side surfaces 22a of the coupling bus bar 21a. A connecting portion 25, to which a wire 33 of the flexible wiring board 30 is connected, is arranged in a middle section of the longitudinal side surface 22b on the inner side of the coupling bus bar 21a (for example, a section spaced from the two transverse side surfaces 22a by equal distances).

The connecting portion 25 has at least one cutout portion 26, which is formed by cutting out part of the coupling bus bar 21a. Specifically, the cutout portion 26 has an inner surface 26a (see FIG. 4B), which joins the front surface and the back surface of the coupling bus bar 21a to each other. It is preferable that the cutout portion 26 be formed without a sharp corner portion. This is because a sharp corner portion of the cutout portion 26 would create a section that is not filled with solder 41 (a void). For example, an inner surface 26a of the cutout portion 26 may be configured by two opposed inner side surfaces 26x and a curved surface 26y, which joins the inner side surfaces 26x to each other.

Preferably, each connecting portion 25 has two or more cutout portions 26. In this case, a projection 27 is formed between two cutout portions 26.

Figure 4B:
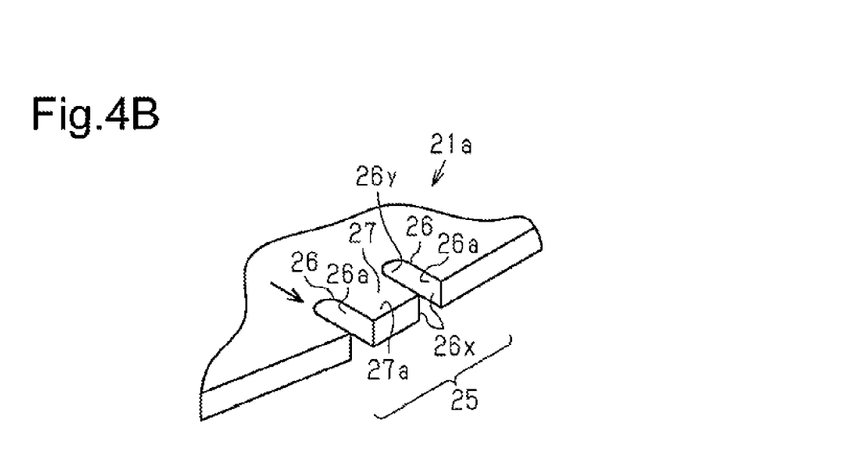
FIG. 4B is a partial perspective view showing the coupling bus bar in a deformed state.

When two of the battery cells 10 coupled by the coupling bus bar 21a are vibrated, moved, or subjected to temperature variation, and thus expand and contract, the coupling bus bar 21a is twisted or bent as illustrated in FIG. 4B. Stress concentrates on an outer-side distal end section (the section indicated by the arrow in FIG. 4B) of each cutout portion 26. This restrains stress from being applied to the projection 27.

Also, when the cells 10 are vibrated, moved, or subjected to temperature variation, and thus expand and contract, the position of the coupling bus bar 21a and the position of the flexible wiring board 30 relative to each other change. At this time, in a solder-connected portion 40 (see FIG. 6A), stress acting to peel an end section 32a of an extension 32 of the flexible wiring board 30 from the coupling bus bar 21a concentrates on the outer-side distal end section of the cutout portion 26 (the section indicated by the arrow in FIG. 4B), or, in other words, the section opposite to the distal end section 27a of the projection 27. This restrains stress (the stress that peels the end section 32a) applied to the projection 27.

It is preferable that the length LA of the projection 27 be not less than 0.5 mm and not greater than 8.0 mm. If the length LA of the projection 27 is not less than 0.5 mm, a fillet length increasing effect, which will be described later, is improved. If the length LA of the projection 27 is greater than 8.0 mm, or if the length of the cutout portion 26 is greater than 8.0 mm, the cross-sectional area of the coupling bus bar 21a (the cross-sectional area along line X-X of FIG. 4A) is small. Particularly, when the transverse width of the coupling bus bar 21a (the distance between the two longitudinal side surfaces 22b) is 20 mm, the thickness of the coupling bus bar 21a is 0.4 mm, and the length LA of the projection 27 is greater than 8.0 mm, the cross-sectional area of the coupling bus bar 21a (the cross-sectional area along line X-X of FIG. 4A) is less than a specified surface area. This increases resistance between the corresponding positive terminal 11 and negative terminal 12. As a result, the coupling bus bar 21a may be heated to a high temperature.

It is preferable that the width LB of the projection 27 be not less than 0.2 mm and not greater than 5.0 mm. If the width LB of the projection 27 is not less than 0.2 mm, the contact area between the projection 27 and a pad 34 is sufficiently large to ensure a preferable shearing strength. If the width LB of the projection 27 is less than 0.2 mm, the contact area with respect to the pad 34 is less than the specified surface area even when the length LA of the projection 27 is 8.0 mm. This may increase an error in measurement of the inter-terminal voltage of the battery cell 10. Specifically, the specified surface area refers to a surface area that is set based on the maximum acceptable value of the contact resistance between the pad 34 and the projection 27.

If the width LB of the projection 27 is greater than 5.0 mm, the number of the cutout portions 26 is limited in the connecting portion 25, which has a predetermined surface area and is arranged in the coupling bus bar 21a. If the width LB of the projection 27 is not greater than 5.0 mm, a preferable contact area is ensured between the projection 27 and the pad 34 to restrain formation of a void, which may decrease strength of the solder-connected portion 40, between the pad 34 and the projection 27.

Each power supply end bus bar 21*b* has a connecting portion 25, which is configured identically with the connecting portion 25 arranged in each coupling bus bar 21*a*. That is, the connecting portion 25 of the power supply end bus bar 21*b* has a cutout portion 26, which is identical with the above-described cutout portion 26. Hereinafter, the coupling bus bars 21*a* and the power supply end bus bars 21*b* will be referred to generally as the bus bars 21 as long as the bus bars 21*a*, 21*b* are described without distinction.

Figure 5:
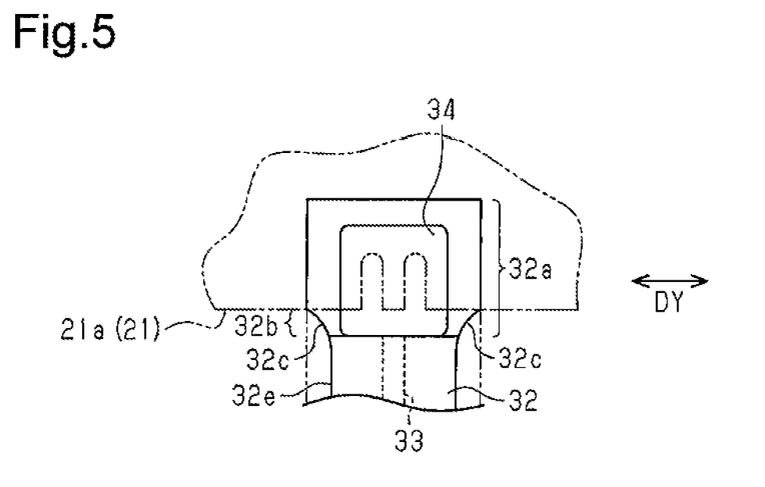
FIG. 5 is a plan view showing an extension of a flexible wiring board.

Referring to FIG. 5, the flexible wiring board 30 will now be described. In the drawing, the long dashed double-short dashed lines denoted by the reference number 21*a* (21) represents the bus bar 21.

Figure 6A:
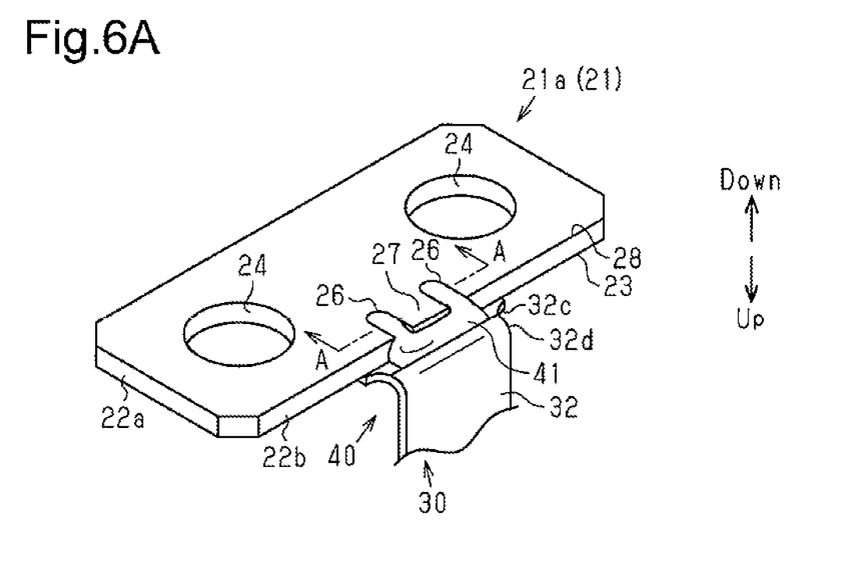
FIG. 6A is a perspective view showing a solder-connected portion.
Figure 6B:
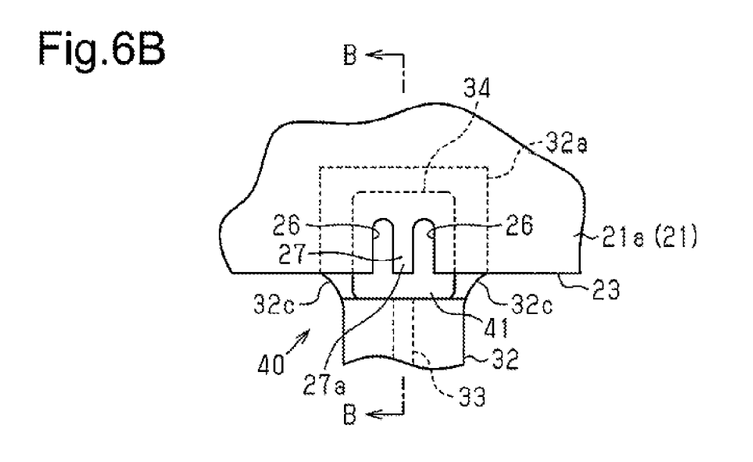
FIG. 6B is a bottom view showing the solder-connected portion.
Figure 6C:
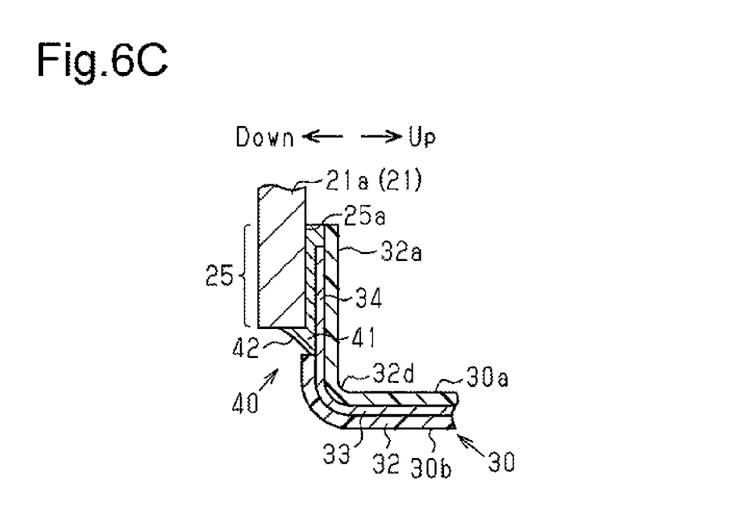
FIG. 6C is a cross-sectional view taken along line B-B of FIG. 6B.

The flexible wiring board 30 is configured by wires 33 connected to the bus bars 21, a base member 30*a*, which supports the wires 33, and a cover layer 30*b*, which covers the wires 33 (see FIG. 6C).

The base member 30*a* and the cover layer 30*b* are made of insulating material or insulating films of polyimide resin, liquid crystal polymer, polyester-based resin, polyvinylchloride-based resin, acrylic-based resin, vinyl-acetate-based resin, amide-based resin, polyphenylene sulfide, polyether ether ketone, polyethylene terephthalate (PET), or the like. The base member 30*a* and the cover layer 30*b* may be made of either the same material or different materials.

The flexible wiring board 30 has the wires 33, the number of which corresponds to the number of the bus bars 21. The pad 34, which is connected to the bus bar 21 with solder, is arranged on an end of the wires 33. The pad 34 is arranged on the end section 32*a* of the extension 32, as will be described later. The other end (the end opposite to the end connected to the bus bar 21) of the wire 33 is connected to a connector 50 (see FIG. 1). The connector 50 is connected to a battery cell state detecting circuit. The battery cell state detecting circuit measures the inter-terminal voltage between the positive terminal 11 and the negative terminal 12 of the battery cells 10. The battery cell state detecting circuit or a control unit arranged in the exterior of the battery cell state detecting circuit determines the state (for example, a charging state) of the battery cell 10 based on the measured inter-terminal voltage.

The flexible wiring board 30 includes a body portion 31 and extensions 32, which are extended from the body portion 31 toward the bus bars 21. The flexible wiring board 30 has the extensions 32 the number of which is at least equal to the number of the bus bars 21. Each of the extensions 32 supports one of the wires 33. The pad 34 of each wire 33 is arranged on the back surface of the end section 32*a* of the corresponding extension 32.

A basal section (a portion connected to the body portion 31) of each extension 32 is folded such that the extension 32 extends toward the bus bar 21 (see FIG. 3). A portion between a body section 32*e* and the end section 32*a* of the extension 32 (hereinafter, referred to as a bent portion 32*d*) is folded such that the end section 32*a* extends outward (see FIG. 3).

As illustrated in FIG. 5, the end section 32*a* has a width greater than the body section 32*e*. That is, the width of the end section 32*a* in the longitudinal direction DY is greater than the width of the body section 32*e* of the extension 32 in the longitudinal direction DY. The width of a base portion 32*b* of the end section 32*a* becomes gradually greater toward the distal end. Edges 32*c* of the base portion 32*b* are each configured by a concave curve (for example, an arc, a quadratic curve, or an exponential curve).

With reference to FIGS. 6A to 6D, the configuration of the portion in which each pad 34 of the flexible wiring board 30 and the connecting portion 25 of the bus bar 21 are connected to each other with the solder 41 (hereinafter, the solder-connected portion 40) will be described.

Figure 6D:
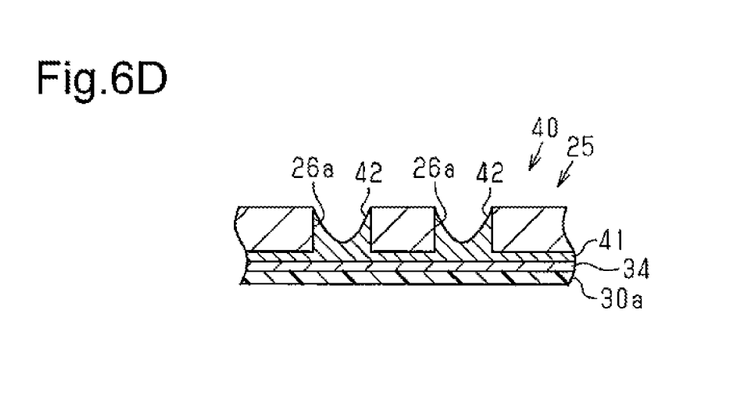
FIG. 6D is a cross-sectional view taken along line A-A of FIG. 6A.

FIG. 6A is a perspective view showing the solder-connected portion 40 as viewed from below. FIG. 6B is a bottom view showing the solder-connected portion 40. FIG. 6C is a cross-sectional view taken along line B-B of FIG. 6B. FIG. 6D is a cross-sectional view taken along line A-A of FIG. 6A.

As shown in FIGS. 6A and 6B, the bus bar 21 and the pad 34 of the wire 33 are connected to each other with the solder 41.

The type of the solder 41 is not restricted, but is preferably a type for reflow soldering. For example, Sn—Cu—Ag-based solder, Sn—Ag-based solder, Sn—Cu-based solder, Sn—Bi-based solder, Sn—Bi—In-based solder, Sn—Ag—Bi—In-based solder, or Sn—Pb-based solder may be used.

The pad 34 is connected to an upper surface 25*a* of the connecting portion 25 (the surface of the connecting portion 25 that faces the body portion 31 of the flexible wiring board 30) with the solder 41. The pad 34 is arranged to overlap at least a section of the cutout portions 26. Preferably, with reference to FIG. 6B, the pad 34 is sized sufficiently to cover the entire cutout portions 26. The end section 32*a* of each extension 32 of the flexible wiring board 30 is connected to the connecting portion 25 such that the pad 34 overlaps the entire cutout portions 26. More preferably, the end section 32*a* of the extension 32 of the flexible wiring board 30 is connected to the connecting portion 25 such that a section of the pad 34 is exposed from the peripheral edge of the bus bar 21 (the longitudinal side surface 22*b*). Such arrangement and solder connection form a fillet 42 of the solder 41 on the entire inner surface 26*a* of each cutout portion 26 and the longitudinal side surface 22*b* of the bus bar 21. The fillet 42, which is formed continuously to the inner surface 26*a* of the cutout portion 26 and the longitudinal side surface 22*b* of the bus bar 21, improves strength of the solder-connected portion 40.

In a case that lacks the cutout portions 26, the fillet 42 is formed only on the longitudinal side surface 22*b* of the bus bar 21. In contrast, in the above-described configuration, the fillet 42 is formed also on the inner surface 26*a* of each cutout portion 26. The length of the fillet 42, which is formed along the side surface of the bus bar 21 (including the inner surface 26*a* of each cutout portion 26 and the longitudinal side surface 22*b*), is thus great compared to the case that lacks the cutout portions 26 in each bus bar 21.

More preferably, referring to FIG. 6B, the base portion 32*b* of the extension 32 (that is, a portion having curved edges 32*c*) is arranged inward with respect to the peripheral edge 23 of the bus bar 21. This is because, if the edge 32*c* of the bent portion 32*d* extends linearly from the end section 32*a* as represented by the long dashed double-short dashed lines in FIG. 5, stress concentrates on the bent portion 32*d* of the extension 32 and may crack or rupture the bent portion 32*d* when the battery cells 10 are vibrated, moved, or subjected to temperature variation, and thus expand and contract, thus twisting or deforming the extension 32. In contrast, when the edges 32*c* of the bent portion 32*d* are curved (see FIG. 6A), the stress applied to the bent portion 32*d* is dispersed, thus deconcentrating the stress on the bent portion 32*d*. This restrains a crack or rupture in the bent portion 32*d* of the extension 32.

The operation of the battery wiring module 20 will now be described with reference to FIGS. 7 and 8.

The battery cells 10 may be vibrated, moved, or subjected to temperature variation, and thus expand and contract. For example, if the power supply device 1 is used as a storage battery for domestic use and the storage battery is arranged at a position where the amount of traffic is great or a position in the vicinity of a railroad track, the battery cells 10 are vibrated or moved through vibration. If the power supply device 1 is mounted in a vehicle, the battery cells 10 are vibrated or moved through vibration. The battery cells 10 are also moved when expanding and contracting due to variation of the ambient temperature. Particularly, those of the battery cells 10 arranged on the ends of the power supply device 1 tend to be displaced greatly. When the battery cells 10 are vibrated and moved, or expand and contract, the battery wiring module 20 and each battery cell 10 move relative to each other. This applies force to the solder-connected portion 40 between the battery wiring module 20 and the battery cell 10. For example, when two of the battery cells 10 are vibrated to be separated from or brought closer to each other, the flexible wiring board 30 is strained or slackened. The state in which the two battery cells 10 are moved to be separated from each other will hereafter be described through comparison between a battery wiring module 120 of a comparative configuration and the battery wiring module 20 of the present embodiment.

Figure 7:
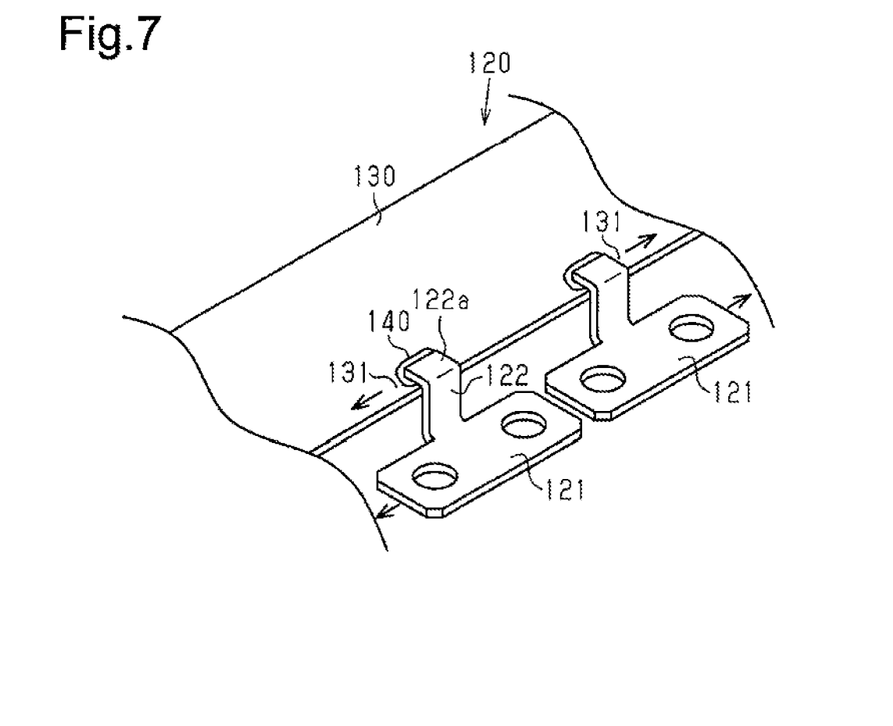
FIG. 7 is a partial perspective view showing a deformed state of a battery wiring module of a comparative configuration.

In the battery wiring module 120 of the comparative configuration shown in FIG. 7, each bus bar 121 has an extension 122. An end section 122a of the extension 122 is connected to a flexible wiring board 30. In this case, when two of the battery cells 10 are separated from each other due to vibration of the battery cells 10, two connecting portions 131 of the flexible wiring board 130 (sections in which the end sections 122a of the extensions 122 are connected to the flexible wiring board 130) are strained. This applies stress to solder-connected portions 140 between the connecting portions 131 of the flexible wiring board 130 and the end sections 122a of the extensions 122 of the bus bar 121. If such stress is applied to the solder-connected portions 140 frequently, a crack may be caused in the solder-connected portions 140.

Figure 8:
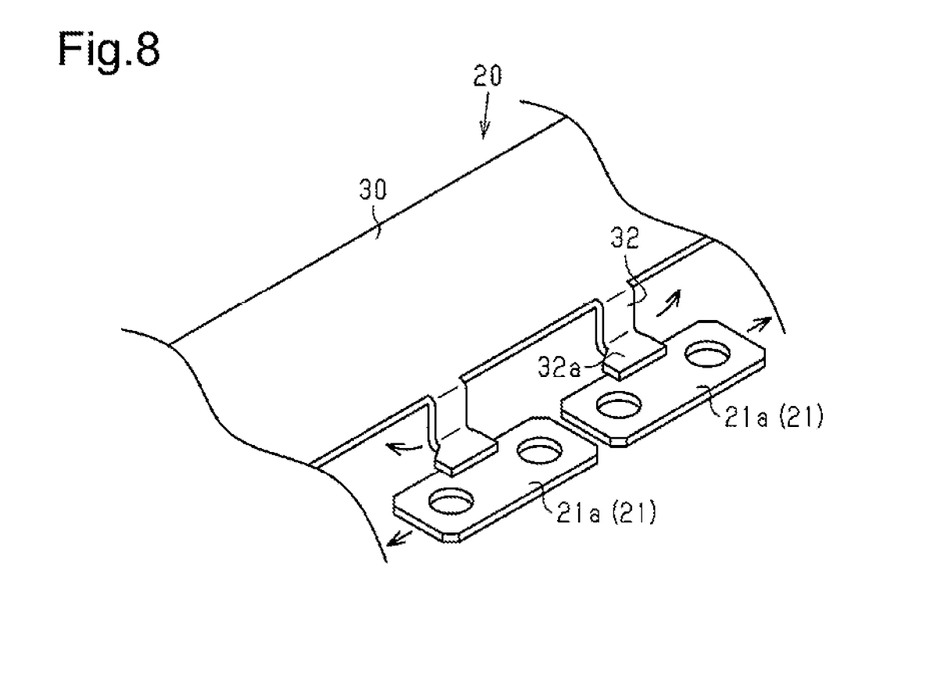
FIG. 8 is a partial perspective view showing a deformed state of the battery wiring module according to one embodiment of the present invention.

In the case of the battery wiring module 20 of the present embodiment, which is shown in FIG. 8, each extension 32 extends from the body portion 31 of the flexible wiring board 30 and the end section 32a of the extension 32 is connected to the bus bar 21, as has been described. If two battery cells 10 are separated from each other due to vibration of the battery cells 10, the end sections 32a of the corresponding two extensions 32 are separated from each other. At this time, the two extensions 32 become either bent with respect to the basal sections (the portions in which the extensions 32 are connected to the body portion 31) as the support point or warped independently from each other. This restrains force from directly acting on the solder-connected portion 40 between the pad 34 arranged on the end section 32a of each extension 32 and the connecting portion 25 of the bus bar 21. Alternatively, a bellows-like folded-back portion (including a folded-back portion having a single fold) may be arranged in each of the extensions 32. This configuration attenuates the force acting on the solder-connected portion 40 between each pad 34 and the connecting portion 25 of each bus bar 21.

Further, as has been described, the cutout portions 26 are arranged in the connecting portion 25 of each bus bar 21 and the fillet 42 of the solder 41 is formed on the inner surface 26a of each cutout portion 26. Since the pad 34 is arranged to be exposed from the peripheral edge 23 of the bus bar 21, the fillet 42 of the solder 41 is formed also on the corresponding longitudinal side surface 22b of the bus bar 21. Additionally, there is a solder layer on the upper surface 25a of the bus bar 21. In this manner, the solder 41 contacts the upper surface 25a, the longitudinal side surface 22b, and the inner surface 26a of each cutout portion 26 of the bus bar 21. The respective surfaces to which the solder 41 is applied extend in different directions. That is, the solder-connected portion 40 has such a structure that peeling or cracking is less likely to occur during vibration of the battery cells 10 in any of the vertical direction DZ, the transverse direction DX, and the longitudinal direction DY. This structure restrains peeling or cracking in the solder-connected portion 40.

The battery wiring module 20 according to the present embodiment has the advantages described below.

(1) The battery wiring module 20 includes the bus bars 21 and the flexible wiring board 30 having the wires 33, which are connected to the corresponding bus bars 21. The flexible wiring board 30 has the body portion 31 and the extensions 32, which extend from the body portion 31 toward the corresponding bus bars 21. The pads 34, each of which is part of a wire 33, are arranged on the end sections 32a of the extensions 32. Each of the bus bars 21 has at least one cutout portion 26. Each of the pads 34 is arranged on the bus bars 21 to overlap at least part of each cutout portion 26. The pad 34 and at least part of the cutout portion 26 are connected to each other with the solder 41.

In this configuration, each extension 32, which extends from the body portion 31 of the flexible wiring board 30 toward the corresponding bus bar 21, is connected to the bus bar 21. As a result, when the battery cells 10 are vibrated, moved, or subjected to temperature variation, and thus expand and contract, stress is less likely to be applied to the solder-connected portions 40.

The solder 41, which connects the pad 34 of each wire 33 and the corresponding bus bar 21 to each other, forms the fillet 42 along each cutout portion 26 arranged in the bus bar 21. The length of the fillet 42, which is formed along the side surface of the bus bar 21, is thus increased compared to a solder-connected structure in which a bus bar 21 lacking the cutout portions 26 and the pad 34 of each wire 33 are connected to each other with the solder 41. This improves the connection strength of each solder-connected portion 40 between the bus bar 21 and the pad 34 of the wire 33 (referred to as a fillet length increasing effect) and restrains breakage from being caused by a crack during long-term use. That is, the solder-connected structure is less likely to break even when receiving stress.

The wires 33, which are connected to the bus bars 21, are arranged in the flexible wiring board 30. This makes it unnecessary to connect the wires 33 separately to the corresponding bus bars 21. As a result, assembly of the battery wiring module 20 is simplified.

(2) The bus bars 21 are arranged at a different level with respect to the body portion 31 of the flexible wiring board 30. Each pad 34 is connected to the upper surface 25a (the surface that faces the body portion 31 of the flexible wiring board 30) of the corresponding bus bar 21.

If each pad 34 is connected to the lower surface (the surface opposite to the upper surface 25a) of the corresponding bus bar 21, the extension 32 of the flexible wiring board 30 and the bus bar 21 may contact each other. In this case, vibration of the battery cell 10 causes the peripheral edge 28 of the bus bar 21 to rub on the extension 32 of the flexible wiring board 30 and the extension 32 may be cut. Particularly, if the flexible wiring board 30 and the battery cell 10 are separated in the vertical direction DZ through vibration of the battery cell 10, the extension 32 is strained such that the peripheral edge 28 of the bus bar 21 rubs on the extension 32 of the flexible wiring board 30. The extension 32 thus may become highly likely to be cut. However, in the above-described configuration, each extension 32 of the flexible wiring board 30 and the peripheral edge 28 of the corresponding bus bar 21 cannot contact each other. This restrains wear and deterioration, such as cutting of the extensions 32 caused by rubbing.

(3) Each pad 34 is positioned with respect to the corresponding bus bar 21 such that a section of the pad 34 is exposed from the peripheral edge 23 of the bus bar 21.

This configuration facilitates formation of each fillet 42 on the corresponding side surface of the bus bar 21. As a result, the connection strength of the solder-connected portion 40 between each bus bar 21 and the pad 34 of the corresponding wire 33 is further improved.

(4) Each bus bar 21 has the cutout portions 26.

In this configuration, the projection 27 is formed between the two cutout portions 26. The projection 27 brings about the effect described below. When the battery cells 10 are vibrated, moved, or subjected to temperature variation, and thus expand and contract, the corresponding bus bars 21 may be twisted or bent. At this time, stress concentrates on the cutout portions 26 such that the stress applied to each projection 27 is reduced. That is, in the above-described configuration, stress caused by deformation of each bus bar 21 is less likely to be applied to at least the projection 27 in the solder-connected portion 40 between the bus bar 21 and the pad 34. This restrains peeling of the bus bar 21 and the pad 34 from each other caused by deformation of the bus bar 21.

Further, when the battery cells 10 are vibrated, moved, or subjected to temperature variation, and thus expand and contract, the positions of each coupling bus bar 21a and the flexible wiring board 30 relative to each other are changed. At this time, in the solder-connected portion 40, stress acting to peel the end section 32a of the extension 32 of the flexible wiring board 30 from the coupling bus bar 21a concentrates on the outer-side distal end section of each cutout portion 26 (the section indicated by the arrow in FIG. 4B), which is the section opposite to the distal end section 27a of the projection 27. Stress (the stress that peels the end section 32a) is thus less likely to be applied to the projection 27.

(5) Each cutout portion 26 has the inner surface 26a (see FIG. 4B), which joins the front surface (the upper-side surface) of the bus bar 21 and the back surface (the surface opposed to the battery block 2) to each other.

If only an increased surface area by which the solder 41 contacts the connecting portion 25 of each bus bar 21 is desired, arranging a groove in the connecting portion 25 may be sufficient. However, if the groove is a simple groove, determination as to whether the solder 41 is received in the groove cannot be made from the exterior in the process of manufacturing the battery wiring module 20. According to the above-described configuration, it is possible to observe the formation of the fillet 42 on the inner surface 26a of each cutout portion 26. Also, when each pad 34 of the flexible wiring board 30 is soldered to the connecting portion 25 of the corresponding bus bar 21 in the step of manufacturing the battery wiring module 20, the pad 34 can be visually checked through each cutout portion 26 by the naked eye or using a microscope. This reduces insufficient solder connections.

(6) Since the battery wiring module 20 is composed of the flexible wiring board 30 and the bus bars 21, it is possible to connect the flexible wiring board 30 and the bus bars 21 by reflow soldering. This simplifies the manufacture of the battery wiring module 20, compared to a conventional battery wiring module in which an electric cable is arranged in each of the bus bars 21.

(7) In the battery wiring module 20, various types of electronic components can be arranged on the flexible wiring board 30. By mounting an electronic component on the battery wiring module 20, the battery wiring module 20 is provided with an additional function besides a signal transmitting function for transmitting a voltage signal. For example, a temperature sensor may be attached to the flexible wiring board 30. This configuration allows measurement of the temperature in an accommodating chamber, which accommodates the power supply device 1.

(8) The power supply device 1 includes the above-described battery wiring module 20 and the battery cells 10, which are connected together by the battery wiring module 20. This configuration restrains stress from being applied to the solder-connected portions 40. It is thus unlikely that voltage detection of the battery cells 10 will be hampered in the power supply device 1. Also, the wires 33, which are connected to the bus bars 21, are arranged in the flexible wiring board 30. This makes it unnecessary to connect the wires 33 separately to the corresponding bus bars 21. This simplifies the assembly of the power supply device 1.

Examples

Manufacturing examples of the battery wiring module 20 will hereafter be described.

Each bus bar 21 was formed by punching a tin-plated copper alloy material having a thickness of 0.4 mm using a press. The bus bar 21 had, for example, a rectangular shape of 30 mm×20 mm and had two insertion holes 24, each of which had a diameter of 8 mm. Two cutout portions 26 were arranged at positions corresponding to equal distances from the two insertion holes 24. The pitch between the two cutout portions 26 was 1.6 mm. The width of each cutout portion 26 was 0.8 mm. The width LB of the projection 27 between the two cutout portions 26 was 0.8 mm. The length LA of each cutout portion 26 (the projection 27) was 2 mm. In a case in which the bus bar 21 was accommodated in a plastic case, small cutouts that would be engaged with projections of the plastic case were formed in the vicinities of the four corner portions.

Each pad 34 of the flexible wiring board 30 was configured in a square shape of 4.5 mm×4.5 mm. Solder paste with a composition of 3.0 mass % Ag, 0.5 mass % copper, and the balance Sn was printed on the pad 34 using a metal mask having a thickness of 0.1 mm.

Each pad 34 of the flexible wiring board 30 was arranged on the corresponding bus bar 21 in the manner described below. The end sections 32a of the extensions 32 of the flexible wiring board 30 and the bus bars 21 were positioned such that each pad 34 of the flexible wiring board 30 was exposed from the peripheral edge of the corresponding bus bar 21 by a margin of 1 mm and that the entire cutout portion 26 of the bus bar 21 was arranged on the pad 34.

After being assembled in this manner, the flexible wiring board 30 and the bus bars 21 were placed in a reflow furnace. The flexible wiring board 30 and the bus bars 21 were then connected to each other with solder in the reflow furnace in such a temperature condition in which the temperature of each bus bar 21 was not higher than 240° C.

The battery wiring module 20 was obtained by the steps described above. In each solder-connected portion 40, the fillet 42 of the solder 41 was formed on the inner surface 26a of each cutout portion 26 and the corresponding longitudinal side surface 22b of the bus bar 21.

The advantage of this example will hereafter be described. During the step of manufacturing the battery wiring module 20, a crack or rupture did not occur in any of the extensions 32 of the flexible wiring board 30. This was brought about by the fact that the battery wiring module 20 was configured such that the extensions 32 of the flexible wiring board 30 and the peripheral edge 23 of the bus bar 21 did not rub on each other.

The power supply device 1 in which the battery wiring module 20 was mounted on the battery block 2 was subjected to an energization test. Throughout the period of energization, the temperature of the bus bars 21 never exceeded the upper limit temperature. Also, voltage detection of the battery cell 10 was conducted without a problem throughout the energization period. A vibration test was performed on the power supply device 1 and showed no crack or rupture in any of the extensions 32 of the flexible wiring board 30 caused by rubbing between the extension 32 of the flexible wiring board 30 and the peripheral edge 23 of the bus bar 21. Peeling of the solder 41 did not occur (as determined by visual checking) in any of the solder-connected portions 40, either. After the vibration test, voltage detection of the battery cell 10 was conducted without a problem. The difference in voltage of the battery cell 10 between before and after the vibration test was maintained in a measurement error range.

Other Embodiments

Other embodiments of the connecting portion 25 of the bus bar 21 will be described with reference to FIGS. 9 to 14. The drawings are perspective views showing different embodiments of the bus bar 21 as viewed from below. The components of the bus bar 21 shown in FIGS. 9 to 14 that are the same as the corresponding components of the first embodiment are represented by the same reference numerals as those of the first embodiment.

Figure 9:
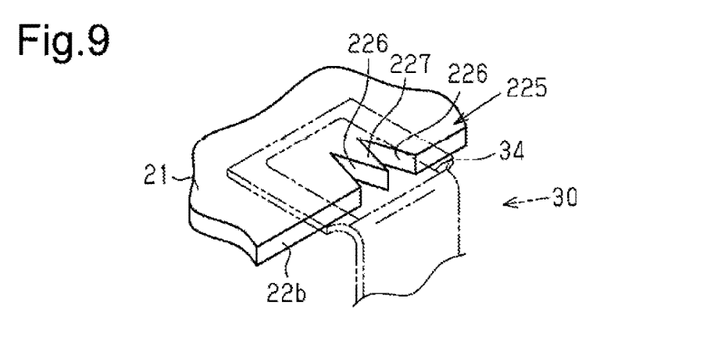
FIG. 9 is a perspective view showing a modification of the connecting portion of the bus bar.

A connecting portion 225 shown in FIG. 9 has at least two cutout portions 226. Unlike the first embodiment, a projection 227, which is arranged between the two cutout portions 226, has a distal end section (an end section on the side corresponding to the longitudinal side surface 22b) that has a width becoming smaller toward the longitudinal side surface 22b. Each of the cutout portions 226 has a width becoming smaller in a direction separating from the longitudinal side surface 22b. This configuration also ensures advantages similar to those of the connecting portion shown in the first embodiment.

Figure 10:
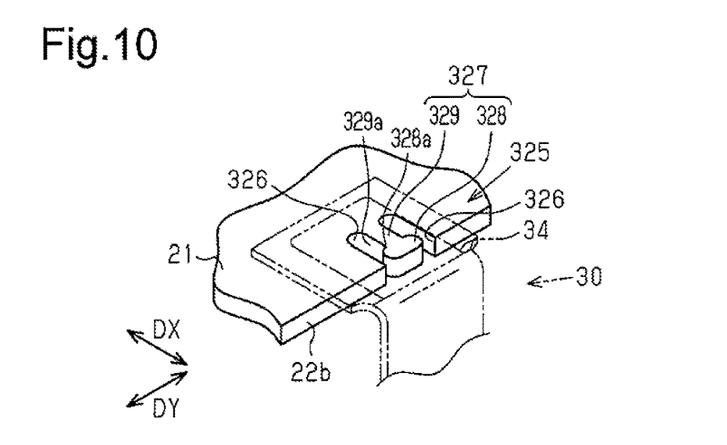
FIG. 10 is a perspective view showing a modification of the connecting portion of the bus bar.

A connecting portion 325 shown in FIG. 10 has at least two cutout portions 326. Unlike the first embodiment, in a projection 327, which is arranged between the two cutout portions 326, the width (the dimension in the longitudinal direction DY) of a distal end section 328 (an end section on the side corresponding to the longitudinal side surface 22b) is greater than the width of a basal section 329. Specifically, the distal end section 328 has an oval shape in a plan view. The elongated direction of the distal end section 328 crosses the extending direction of the projection 327. In this configuration, the length of the circumference of the projection 327 is greater than that of the projection 27 shown in the first embodiment. The length of a fillet formed in the connecting portion 325 is thus great compared to that of the connecting portion 25 shown in the first embodiment. This further improves the fillet length increasing effect (that is, the effect of improving the connection strength). As illustrated in FIG. 10, the outline of the distal end section 328 in a plan view includes at least an arc and is configured such that the central angle of the arc is greater than 180 degrees or that the sum of the central angles of two arcs is greater than 180 degrees. This configuration (hereinafter, referred to as a central angle increasing structure) ensures the effect described below. That is, relative movement of the flexible wiring board 30 and the bus bar 21 applies stress to the connecting portion 325 from different directions. However, the above-described configuration enlarges the section capable of squarely receiving the stress (that is, the section including a surface perpendicular to the acting direction of the stress). This further restrains peeling of solder connection in the connecting portion 325. For example, the stress that acts at the time the bus bar 21 and the pad 34 of the flexible wiring board 30 are separated from each other in the transverse direction DX is received by a basal-section-side section 328a of the distal end section 328. This attenuates the stress along the surface of the connecting portion between an inner surface 329a of the basal section 329 and the solder, thus restraining peeling of the solder. Hereinafter, this effect will be referred to as a solder peeling restraining effect based on the central angle increasing structure.

Figure 11:
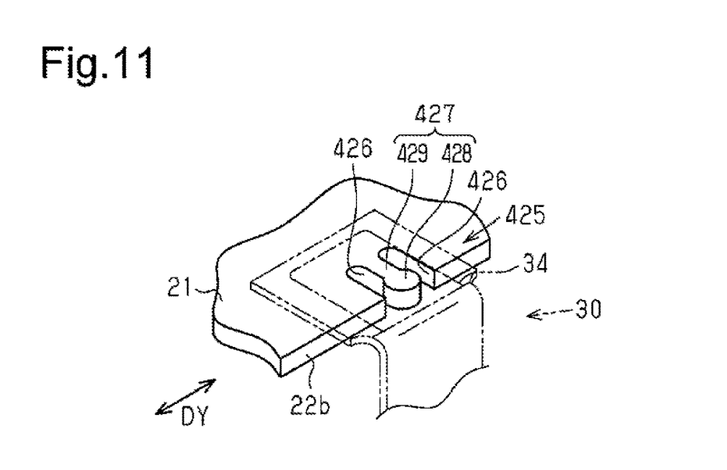
FIG. 11 is a perspective view showing a modification of the connecting portion of the bus bar.

A connecting portion 425 shown in FIG. 11 is a modification of the connecting portion 325 of FIG. 10, in which the structure of the distal end section 328 of the projection 327 is modified. The connecting portion 425 has at least two cutout portions 426. A projection 427, which is arranged between the two cutout portions 426, has a basal section 429 and a distal end section 428. The distal end section 428 of the projection 427 has a width (the dimension in the longitudinal direction DY) greater than the width of the basal section 429. The distal end section 428 has a circular shape in a plan view. This further improves the fillet length increasing effect (that is, the effect of improving the connection strength), like the connecting portion 325, which is shown in FIG. 10. Further, since the distal end section 428 of FIG. 11 has a circular shape in a plan view, the connecting portion 425 brings about the solder peeling restraining effect based on the central angle increasing structure.

Figure 12:
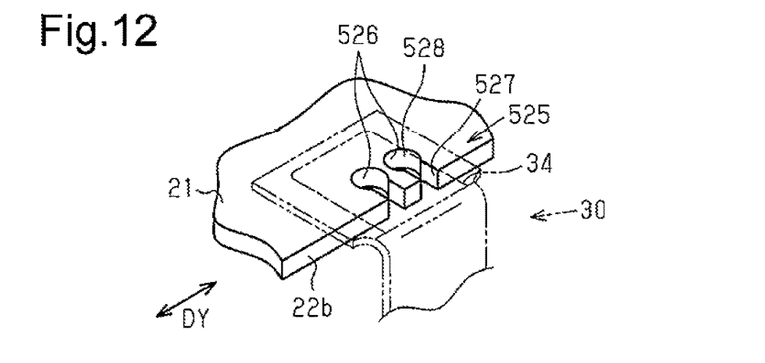
FIG. 12 is a perspective view showing a modification of the connecting portion of the bus bar.

A connecting portion 525 shown in FIG. 12 has at least two cutout portions 526. Each of the cutout portions 526 includes a first section 527, which is on the side corresponding to the longitudinal side surface 22b of the bus bar 21, or, in other words, on the side corresponding to the peripheral edge, and a second section 528, which is located closer to the center of the bus bar 21 than the first section 527. The second section 528 has a width (the dimension in the longitudinal direction DY) greater than the width of the first section 527. In this configuration, the length of the circumference of each cutout portion 526 is greater than that of the cutout portion 26 illustrated in the first embodiment. The length of a fillet formed in the connecting portion 525 is thus great compared to the connecting portion 25 shown in the first embodiment. This further improves the fillet length increasing effect (that is, the effect of improving the connection strength). In this example, the outline of each second section 528 includes at least an arc in a plan view and is configured such that the central angle of the arc is greater than 180 degrees or that the sum of central angles of two arcs is greater than 180 degrees. The connecting portion 525 thus brings about an effect similar to the solder peeling restraining effect based on the central angle increasing structure. The structure of the cutout portion 526 of the connecting portion 525 may be employed in the cutout portion 326, 426 of each of the connecting portions 325 and 425, which are shown in FIGS. 10 and 11, respectively.

Figure 13:
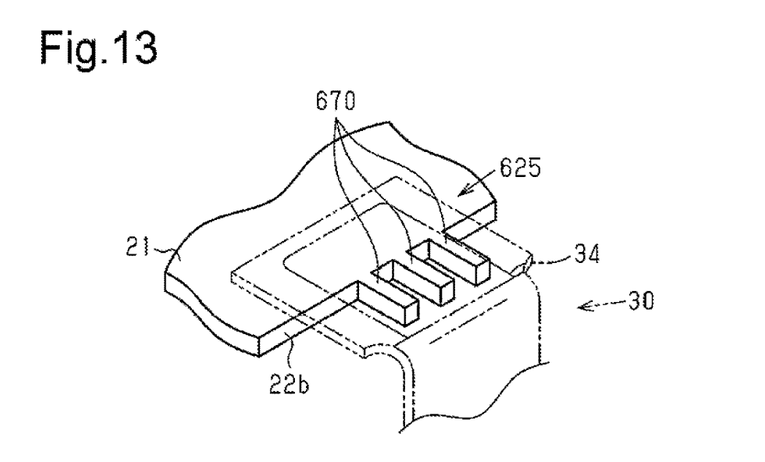
FIG. 13 is a perspective view showing a modification of the connecting portion of the bus bar.

A connecting portion 625 shown in FIG. 13 has three projecting portions 670, instead of the cutout portions 26 shown in the first embodiment. The width of each of the projecting portions 670 is uniform in the extending direction of the projecting portion 670. The pad 34 of the flexible wiring board 30 is arranged to overlap at least a section of the projecting portion 670. Preferably, the pad 34 is sized sufficiently to cover the entire three projecting portions 670 and is arranged to overlap the entire three projecting portions 670. By connecting the pad 34 of the flexible wiring board 30 and the projecting portions 670 to each other with solder, a fillet is formed around each projecting portion 670. That is, the projecting portion 670 brings about the effect of increasing the fillet length (that is, the fillet length increasing effect). The connecting portion 625 thus exerts an effect similar to that of the connecting portion 25 of the first embodiment.

Figure 14:
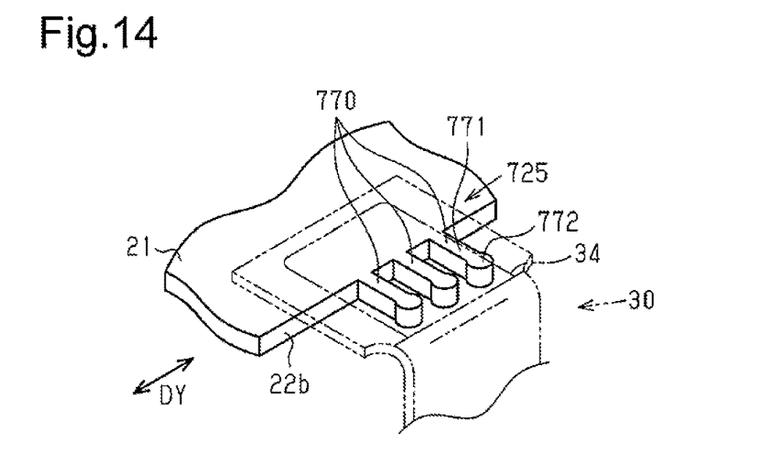
FIG. 14 is a perspective view showing a modification of the connecting portion of the bus bar.

A connecting portion 725 shown in FIG. 14 has three projecting portions 770. Each of the projecting portions 770 includes a basal section 771 and a distal end section 772. The width (the dimension in the longitudinal direction DY) of the distal end section 772 is greater than the width of the basal section 771. In this configuration, the length of the circumference of each projecting portion 770 is greater than that of the projecting portion 670, which is shown in FIG. 13. The length of a fillet formed in the connecting portion 725 is thus great compared to the connecting portion 625, which is shown in FIG. 13. This further improves the fillet length increasing effect (that is, the effect of improving the connection strength). In this example, the outline of each distal end section 772 includes at least an arc in a plan view and is configured such that the central angle of the arc is greater than 180 degrees or that the sum of central angles of two arcs is greater than 180 degrees. The connecting portion 725 thus brings about an effect similar to the solder peeling restraining effect based on the central angle increasing structure.

The above illustrated embodiments may be modified as follows.

When the battery wiring module 20 is attached to the top of the battery block 2, it is preferable that the flexible wiring board 30 and each bus bar 21 be accommodated in a plastic protector (a plastic case) and then attached to the battery block 2.

As long as the body portion 31 of the flexible wiring board 30 or the bus bars 21 do not interfere with the aforementioned electrolytic solution discharge valve or the duct for receiving discharged liquid, the body portion 31 and the bus bars 21 may be arranged flush with one another. In this case, by forming a bulging folded portion in each extension 32 that extends from the body portion 31 and connecting the pad 34 of the extension 32 to the upper surface of the bus bar 21 with solder, advantages equivalent to the advantages of the present embodiment are obtained.

Figure 15:
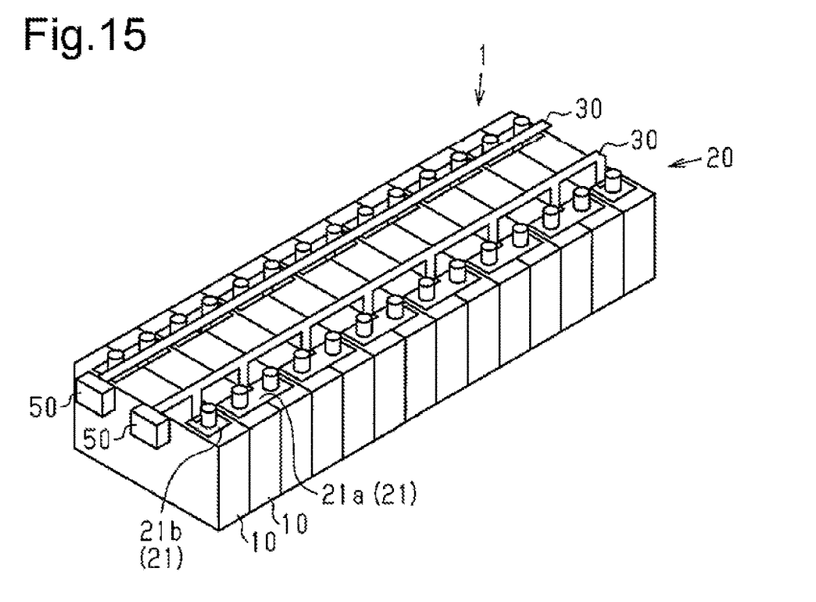
FIG. 15 is a perspective view showing a modification of the power supply device.

With reference to FIG. 15, the battery wiring module 20 may include, for example, two flexible wiring boards 30. The two flexible wiring boards 30 are arranged in correspondence with two electrode rows, which are arranged in the longitudinal direction DY of the battery block 2.

Figure 16:
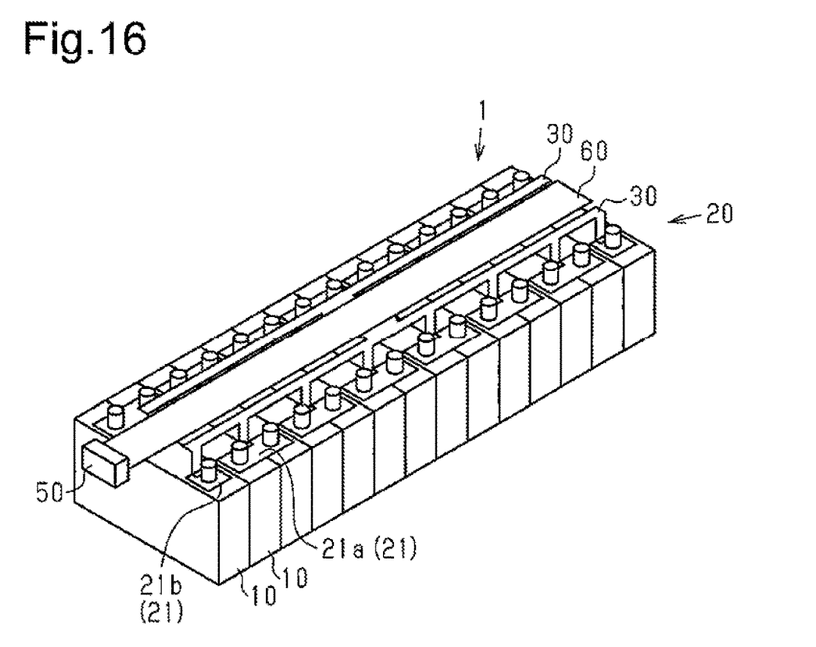
FIG. 16 is a perspective view showing a modification of the power supply device.

As illustrated in FIG. 16, if the battery wiring module 20 has two flexible wiring boards 30, a printed wiring board 60, which supports the two flexible wiring boards 30, may be employed. In this case, the printed wiring board 60 and each of the flexible wiring boards 30 are connected to each other through a connector 50 or between terminals.

The above-described embodiments are illustrated by way of example, and the present invention is not restricted to the embodiments. Various replacements, changes, and modifications may be conducted on the disclosed illustrative embodiments without departing from the gist or scope of the invention. For example, the main subject of the present invention may be present in fewer characteristics than all the characteristics of a specific disclosed embodiment. The scope of the invention is included in the detailed description and each of the claims describes an independent embodiment. The scope of the invention is intended to include all replacement forms, changed forms, and modified forms, together with all equivalents thereof, in the scope of the invention.

DESCRIPTION OF THE REFERENCE NUMERALS

1 . . . Power Supply Device, 2 . . . Battery Block, 2a . . . Upper Surface, 10 . . . Battery Cell, 11 . . . Positive Terminal, 12 . . . Negative Terminal, 20 . . . Battery Wiring Module, 21 . . . Bus Bar, 21a . . . Coupling Bus Bar, 21b . . . Power Supply End Bus Bar, 22a . . . Transverse Side Surface, 22b . . . Longitudinal Side Surface, 23 . . . Peripheral Edge, 24 . . . Insertion Hole, 25 . . . Connecting Portion, 25a . . . Upper Surface, 26 . . . Cutout Portion, 26a . . . Inner Surface, 26x . . . Inner Side Surface, 26y . . . Bent Surface, 27 . . . Projection, 27a . . . Distal End Section, 28 . . . Peripheral Edge, 30 . . . Flexible Wiring Board, 30a . . . Base Member, 30b . . . Cover Layer, 31 . . . Body Portion, 32 . . . Extension, 32a . . . End Section, 32b . . . Base Portion, 32c . . . Edge, 32d . . . Bent Portion, 32e . . . Body Section, 33 . . . Wire, 34 . . . Pad, 40 . . . Solder-connected Portion, 41 . . . Solder, 42 . . . Fillet, 50 . . . Connector, 60 . . . Printed Wiring Board, 120 . . . Battery Wiring Module, 121 . . . Bus Bar, 122 . . . Extension, 122a . . . End Section, 130 . . . Flexible Wiring Board, 131 . . . Connecting Portion, 140 . . . Solder-connected Portion, 225 . . . Connecting Portion, 226 . . . Cutout Portion, 227 . . . Projection, 325 . . . Connecting Portion, 326 . . . Cutout Portion, 327 . . . Projection, 328 . . . Distal End Section, 328a . . . Basal-Section-Side Portion, 329 . . . Basal Section, 329a . . . Inner Surface, 425 . . . Connecting Portion, 426 . . . Cutout Portion, 427 . . . Projection, 428 . . . Distal End Section, 429 . . . Basal Section, 525 . . . Connecting Portion, 526 . . . Cutout Portion, 527 . . . First Section, 528 . . . Second Section, 625 . . . Connecting Portion, 670 . . . Projecting Portion, 725 . . . Connecting Portion, 770 . . . Projecting Portion, 771 . . . Basal Section, 772 . . . Distal End Section, SA . . . Space, DA . . . Arrangement Direction, DX . . . Transverse Direction, DY . . . Longitudinal Direction, DZ . . . Vertical Direction, LA . . . Length, LB . . . Width.

The invention claimed is:

1. A battery wiring module comprising:
a plurality of bus bars for connecting a plurality of battery cells of a battery block in series; and
a flexible wiring board having a plurality of wires each connected to a corresponding one of the bus bars, wherein
the flexible wiring board has a body portion and a plurality of extensions that extends from the body portion toward the respective bus bars,
each of the extensions has a basal section being folded such that the extension extends toward one of the bus bars,
each of the extensions supports one of the wires, wherein each extension has an end section, and
a pad that is part of each wire is arranged on the end section, each of the bus bars has at least one cutout portion, wherein the pad is arranged on one of the bus bars such that the pad overlaps at least part of the at least one cutout portion, and the pad and the at least part of the at least one cutout portion are connected to each other with solder.

2. The battery wiring module according to claim 1, wherein the bus bars are arranged at a different level with respect to the body portion of the flexible wiring board, and each pad is connected to a surface of the corresponding bus bar that faces the body portion of the flexible wiring board.

3. The battery wiring module according to claim 1, wherein each pad is positioned with respect to the corresponding bus bar such that part of the pad is exposed from a peripheral edge of the bus bar.

4. The battery wiring module according to claim 1, wherein the cutout portion of each bus bar is one of a plurality of cutout portions.

5. The battery wiring module according to claim 4, wherein each bus bar has a projection arranged between two of the cutout portions, the projection has a basal section and a distal end section, and a width of the distal end section is greater than a width of the basal section.

6. The battery wiring module according to claim 1, wherein the at least one cutout portion includes a first section on a side corresponding to the peripheral edge of the corresponding bus bar and a second section located closer to a center of the bus bar than the first section, and the second section has a greater width than the first section.

7. A battery wiring module comprising:

a plurality of bus bars for connecting a plurality of battery cells of a battery block in series; and a flexible wiring board having a plurality of wires each connected to a corresponding one of the bus bars, wherein the flexible wiring board has a body portion and a plurality of extensions that extends from the body portion toward the respective bus bars, each of the extensions has a basal section being folded such that the extension extends toward one of the bus bars, each of the extensions supports one of the wires, wherein each extension has an end section, and a pad that is part of each wire is arranged on the end section, each of the bus bars has a plurality of projecting portions, wherein the pad is arranged on one of the bus bars such that the pad overlaps at least part of the projecting portions, and the pad and the at least part of the projecting portions are connected to each other with solder.

8. The battery wiring module according to claim 7, wherein the projecting portions each have a basal section and a distal end section, and a width of the distal end section is greater than a width of the basal section.

9. A battery wiring module comprising:

a plurality of bus bars for connecting a plurality of battery cells of a battery block in series; and a flexible wiring board having a plurality of wires each connected to a corresponding one of the bus bars, wherein the flexible wiring board has a body portion and a plurality of extensions that extends from the body portion toward the respective bus bars, each of the extensions has a basal section being folded such that the extension extends toward one of the bus bars, the bus bars are arranged at a different level with respect to the body portion of the flexible wiring board, each of the extensions supports one of the wires, wherein each extension has an end section, and a pad that is part of each wire is arranged on the end section, each of the bus bars has a plurality of cutout portions or a plurality of projecting portions, wherein the pad is arranged on a surface of one of the bus bars that faces the body portion of the flexible wiring board such that the pad overlaps the entire cutout portions or the entire projecting portions and that part of the pad is exposed from a peripheral edge of the bus bar, and each pad and the corresponding bas bar are connected to each other with solder that is arranged at least in the cutout portions or on outer peripheries of the projecting portions and on the part of the pad exposed from the peripheral edge of the bus bar.

10. A power supply device comprising the battery wiring module according to claim 1 and a plurality of battery cells connected together by the battery wiring module.

11. A power supply device comprising the battery wiring module according to claim 7 and a plurality of battery cells connected together by the battery wiring module.

12. A power supply device comprising the battery wiring module according to claim 9 and a plurality of battery cells connected together by the battery wiring module.

* * * * *